(12) United States Patent
Bucher

(10) Patent No.: US 7,079,684 B2
(45) Date of Patent: Jul. 18, 2006

(54) METHOD AND APPARATUS FOR COLOR QUANTIZATION OF IMAGES EMPLOYING A DYNAMIC COLOR MAP

(75) Inventor: Roger Bucher, Zollikofen (CH)

(73) Assignee: Oridus, Inc., Fremont, CA (US)

( * ) Notice: Subject to any disclaimer, the term of this patent is extended or adjusted under 35 U.S.C. 154(b) by 1002 days.

(21) Appl. No.: 10/006,981

(22) Filed: Dec. 5, 2001

(65) Prior Publication Data

US 2003/0103669 A1 Jun. 5, 2003

(51) Int. Cl.
*G06K 9/00* (2006.01)
*G06K 9/36* (2006.01)

(52) U.S. Cl. ...................... 382/166; 382/253
(58) Field of Classification Search ............. 382/162, 382/166, 251, 253; 345/600, 601
See application file for complete search history.

(56) References Cited

U.S. PATENT DOCUMENTS 5,467,110 A * 11/1995 White et al. ............ 345/601
5,734,744 A * 3/1998 Wittenstein et al. ........ 382/166
6,411,730 B1 * 6/2002 Bartell et al. ............... 382/168

* cited by examiner

*Primary Examiner*—Phuoc Tran
(74) *Attorney, Agent, or Firm*—Victor H. Okumoto

(57) ABSTRACT

A method and apparatus for color quantization of an image employs a dynamic color map. Pixels of a first image are mapped into corresponding color space regions while incrementing counts in records of those color space regions. Associated colors of color space regions having largest non-zero counts are included in a color map. If the number of such associated colors is less than a maximum number of color indexes of the color map, the unassigned color indexes are reserved for later assignment. Pixels of subsequent images are also mapped into corresponding color space regions while incrementing counts in records of those color space regions. If unassigned color indexes are available in the color map, associated colors of these color space regions are added to the color map until all color indexes have been assigned.

18 Claims, 7 Drawing Sheets

| COLOR DEPTH (BITS/PIXEL) | # OF COLORS | COMMENTS |
|---|---|---|
| 32 | 4294967296 | TRUE COLOR |
| 24 | 16777216 | TRUE COLOR |
| 16 | 65536 | HIGH COLOR |
| 8 | 256 | USES COLOR MAP |
| 1 | 2 | BLACK & WHITE |

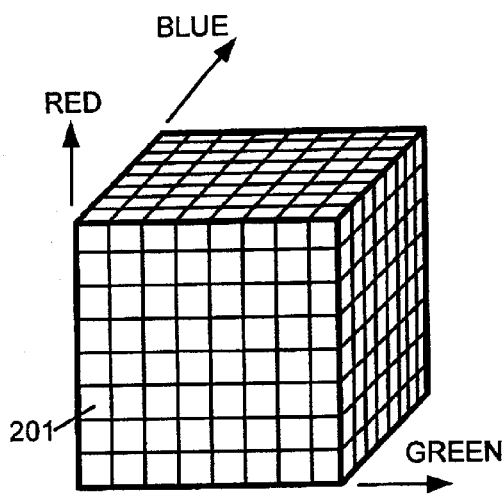
fig.8
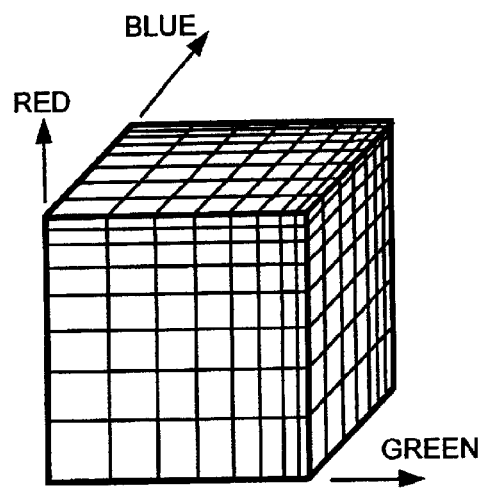
fig.9
| INDEX# | TRUE COLOR |
|---|---|
| 255 | HIGHEST COUNT TRUE COLOR |
| 254 | 2ND HIGHEST COUNT TRUE COLOR |
| 253 | 3RD HIGHEST COUNT TRUE COLOR |
| ... | ... |
| 000 | 256TH HIGHEST COUNT TRUE COLOR |
fig.11

| 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|----|----|----|----|----|----|----|----|
| RED | | | | | | | GREEN | | | | | | | | BLUE | | | | | | | | |

*fig. 7*

| COLOR SPACE # | COUNT | REDSUM | GREENSUM | BLUESUM | USED | INDEX# |
|---|---|---|---|---|---|---|

METHOD AND APPARATUS FOR COLOR QUANTIZATION OF IMAGES EMPLOYING A DYNAMIC COLOR MAP

FIELD OF THE INVENTION

The present invention generally relates to techniques for the compression of computer images and in particular, to a method and apparatus for color quantization of images employing a dynamic color map.

BACKGROUND OF THE INVENTION

When transmitting a sequence of related images, it is useful to minimize the amount of information being transmitted using compression and/or other techniques in order to minimize bandwidth requirements and any undesired delay in rendering the images on a remote display. One such technique is color quantization. This technique employs a color map to reduce the amount of information being transmitted for each pixel. For example, instead of transmitting a "true color" 24-bit value for each pixel, an 8-bit color map index value is transmitted. In such case, a three to one reduction in transmitted bits is accomplished albeit at the expense of having far fewer colors available in the palette.

In many applications, such reduction in available colors is an acceptable trade-off for an increased image transfer rate. However, in other applications, it may result in objectionably diminished image quality. A fixed color map in such cases particularly aggravates the problem.

OBJECTS AND SUMMERY OF THE INVENTION

Accordingly, it is an object of the present invention to provide a method for color quantization of images employing a dynamic color map.

Another object is to provide an apparatus for color quantization of images employing a dynamic color map.

Another object is to provide a method for generating a dynamic color map for color quantization of images.

Still another object is provide an apparatus for generating a dynamic color map for color quantization of images.

These and additional objects are accomplished by the various aspects of the present invention, wherein briefly stated, one aspect is a method for color quantization of an image, comprising: mapping pixels of an image into corresponding color space regions; determining whether the corresponding color space regions are linked to a color map; and if individual of the corresponding color space regions are not linked to the color map, then linking them to the color map where color map linkages are available, or determining color space regions that are linked to the color map and having associated colors closest to colors of the pixels of the individual of the corresponding color space regions where color map linkages are not available.

In another aspect, an apparatus for color quantization of an image, comprises at least one circuit that is configured to: map pixels of an image into corresponding color space regions; determine whether the corresponding color space regions are linked to a color map; and if individual of the corresponding color space regions are not linked to the color map, then link the individual of the corresponding color space regions to the color map where color map linkages are available, or determine color space regions that are linked to the color map and having associated colors closest to colors of the pixels of the individual of the corresponding color space regions where color map linkages are not available.

In another aspect, a method for generating a dynamic color map for color quantization of images, comprises: mapping each pixel of an image into one of a plurality of color space regions; generating a count of pixels mapped into each of the plurality of color space regions; and generating a dynamic color map by including associated colors of color space regions having largest non-zero of such generated counts up to a maximum number that is less than or equal to a number of the plurality of color space regions.

In still another aspect, an apparatus for generating a dynamic color map for color quantization of images, comprises at least one circuit that is configured to: map each pixel of an image into one of a plurality of color space regions; generate a count of pixels mapped into each of the plurality of color space regions; and generate a dynamic color map by including associated colors of color space regions having largest non-zero of such generated counts up to a maximum number that is less than a number of the plurality of color space regions.

In yet another aspect, an apparatus for generating a dynamic color map for color quantization of images, comprises: means for associating each pixel of an image with a corresponding one of a plurality of color spaces; means for generating a count of such pixels for individual of the plurality of color spaces; and means for generating a dynamic color map by including color spaces having largest and non-zero of such counts up to a maximum number of color spaces.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 7 illustrates color information for a pixel having a 24-bit color depth comprising 8 bits of red, 8 bits of green and 8 bits of blue.

FIG. 8 illustrates an RGB color space divided up into uniformly sized color space regions.

FIG. 9 illustrates an RGB color space divided up into non-uniformly sized color space regions.

FIG. 10 illustrates a record for a color space region, utilizing aspects of the present invention.

FIG. 11 illustrates a color map generated by a color map generator utilizing aspects of the present invention.

DETAILED DESCRIPTION OF THE PREFERRED EMBODIMENT

Figure 1:
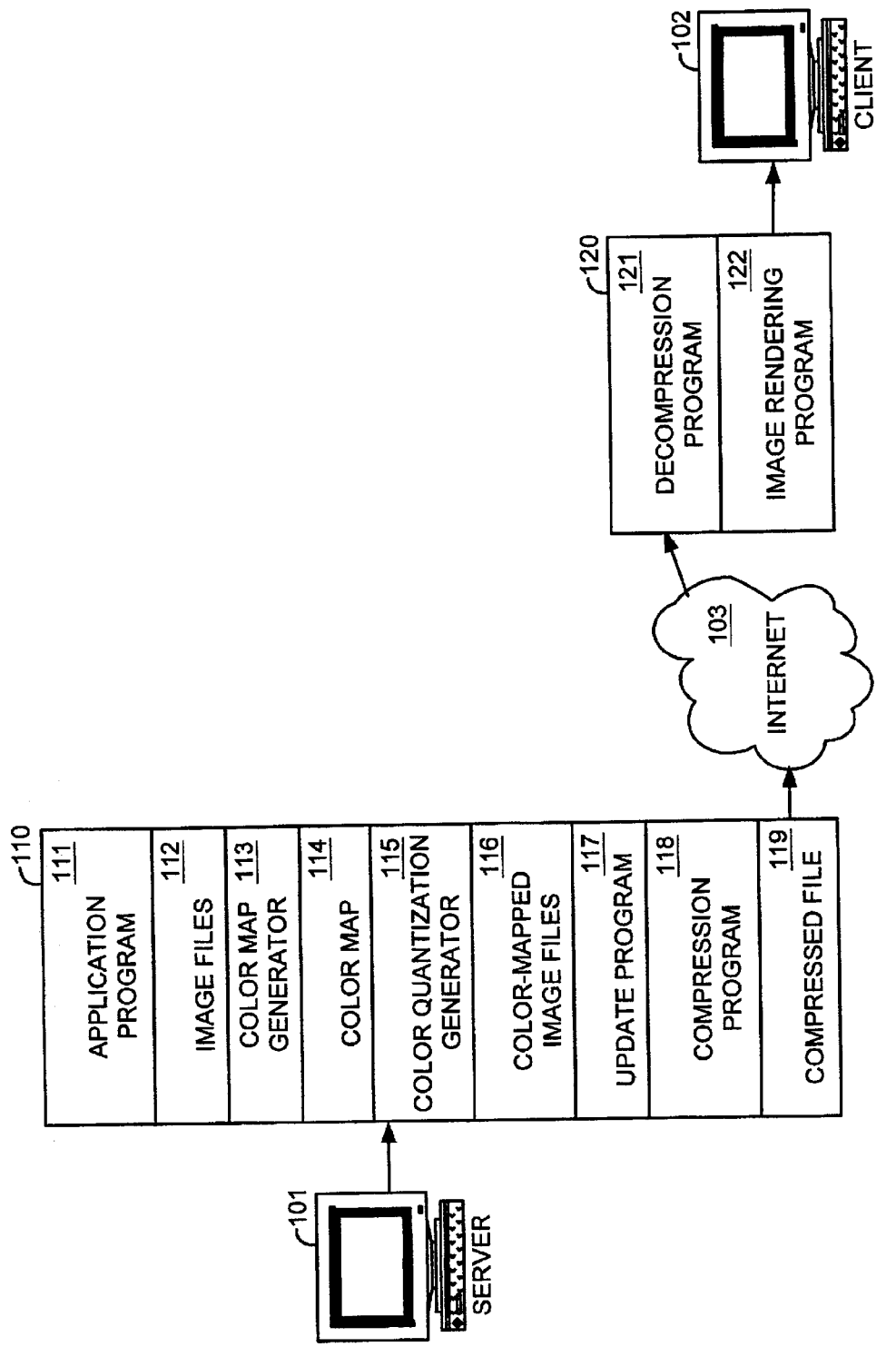
FIG. 1 illustrates a block diagram of a computer system for transmitting images, utilizing aspects of the present invention.

FIG. 1 illustrates, as an example, a block diagram of a system in which a server computer 101 generates and transmits information of a sequence of related images to a client computer 102 over a communication medium such as the Internet 103. The server computer 101 has a conventional memory system 110 including at least one mass storage unit such as a hard disk drive, and system memory such as dynamic random access or other solid-state memory. The client computer 102 also has a conventional memory system 120 that is similarly constructed.

An application program 111 residing in the memory system 110 generates the sequence of related images. The images in this case are referred to as being related to one another, such as frames in video or animation, since each image is often only partially different than its immediately preceding or succeeding image in the sequence. At least two successive images are stored in image files 112. One image is referred to as being an old image whose information has already been transmitted to the client computer 102. Another image is referred to as being a new image whose information is to be transmitted next to the client computer 102.

Figure 2:
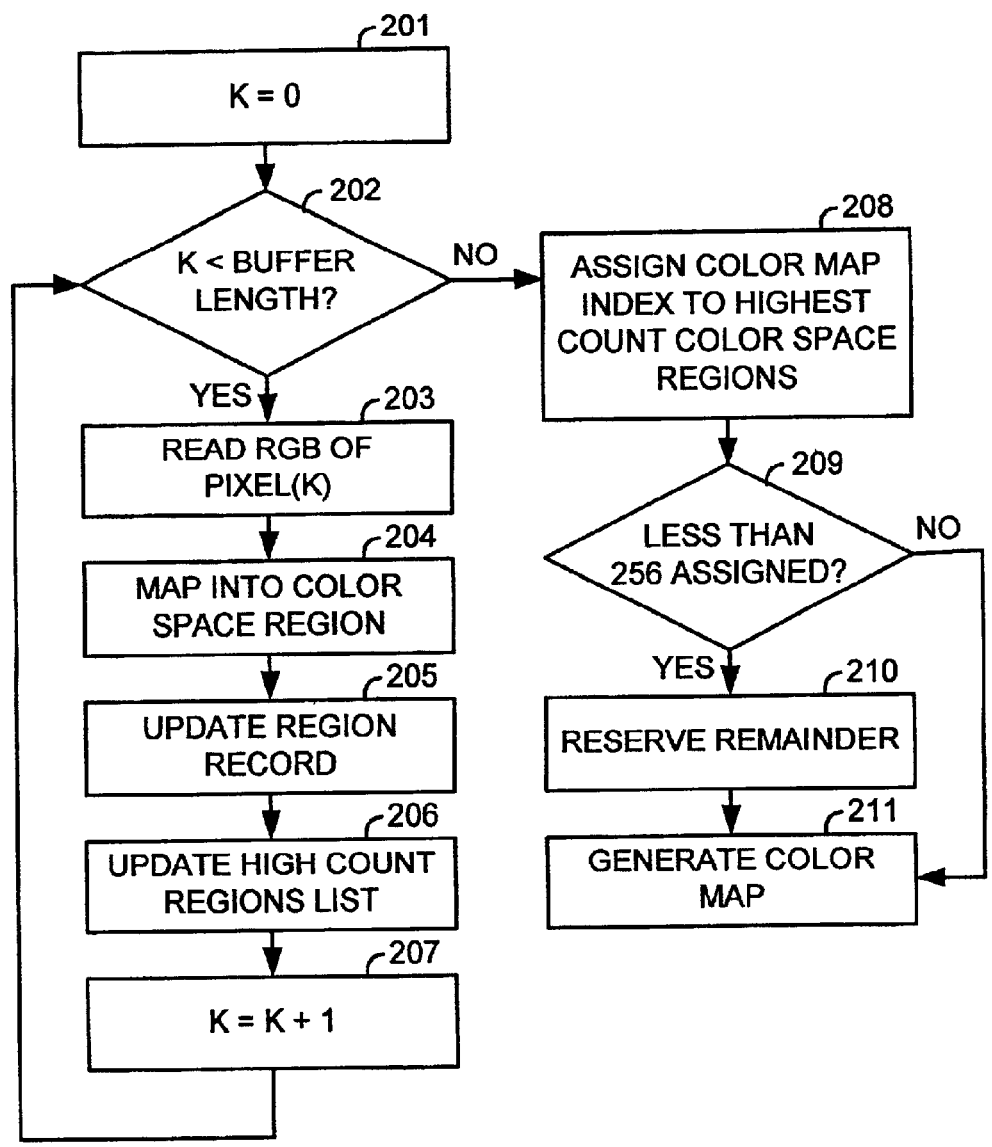
FIG. 2 illustrates a flow diagram of a method for generating a color map, utilizing aspects of the present invention.
Figure 3:
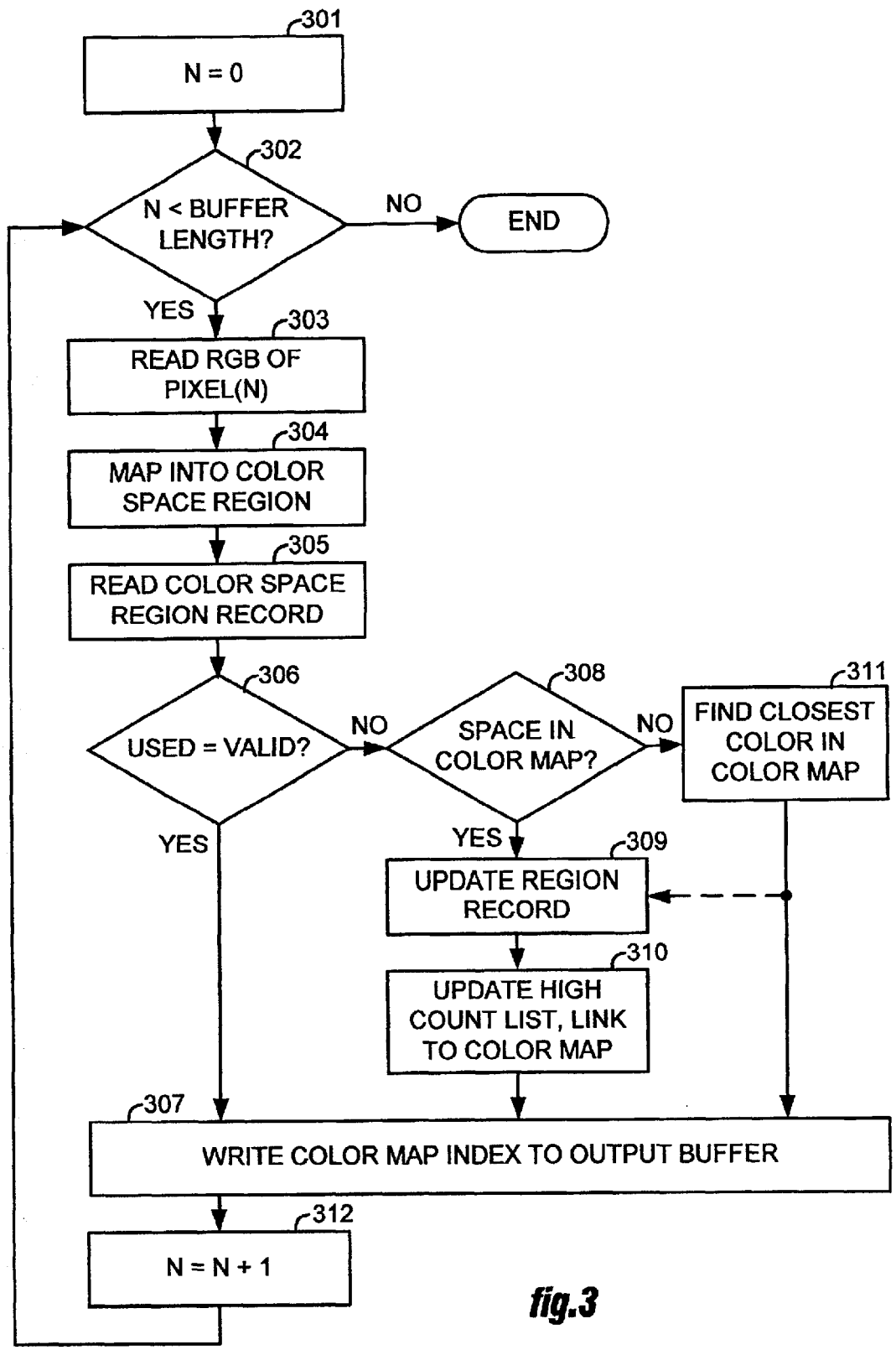
FIG. 3 illustrates a flow diagram of a method for generating a color-mapped image, utilizing aspects of the present invention.
Figure 4:
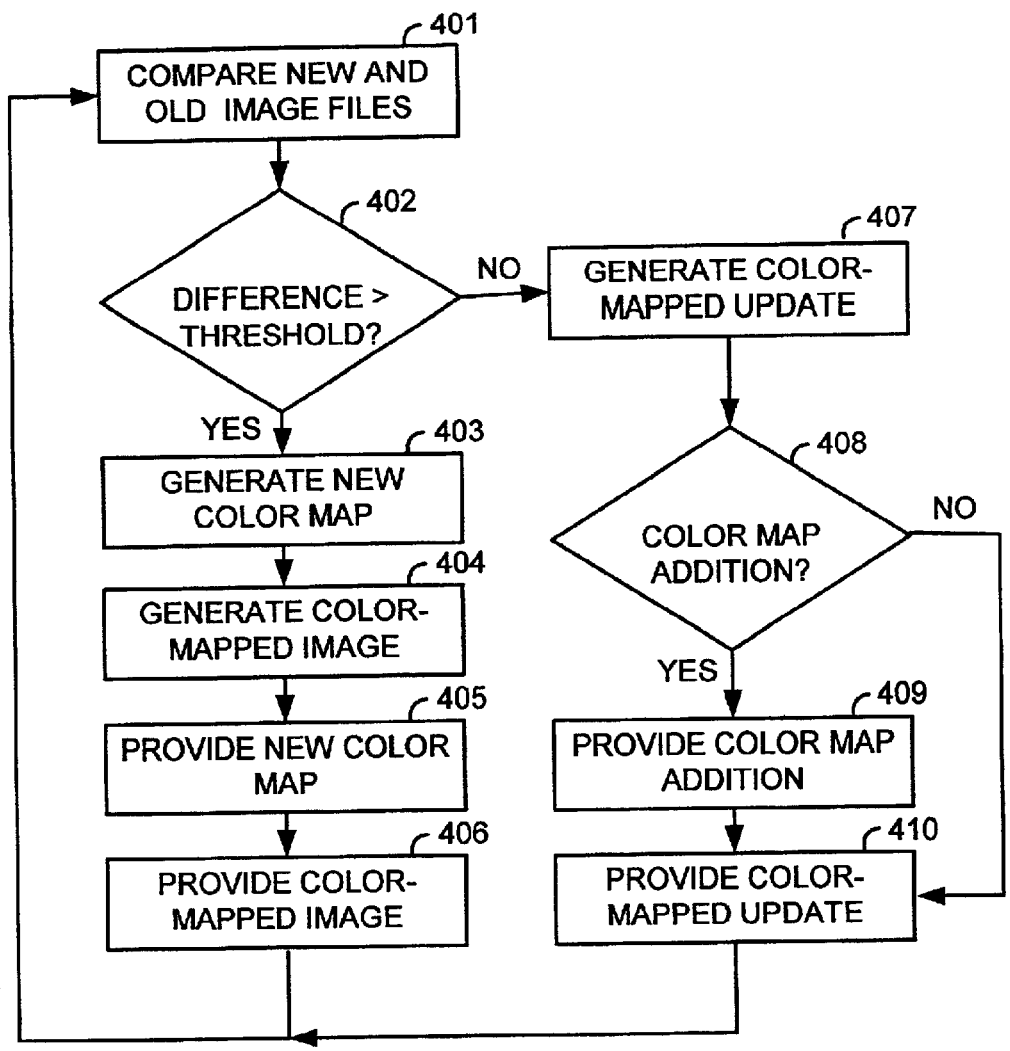
FIG. 4 illustrates a flow diagram of a method for transmitting images, utilizing aspects of the present invention.

A color map generator 113 residing as a program in the memory system 110 generates a dynamic color map 114 from the sequence of images according, for example, to the methods described in reference to FIGS. 2~4. The color map is referred to as being a dynamic color map, because it may be added to according to FIG. 3 or regenerated according to FIG. 4, as colors of the images change during the sequence.

A color quantization generator 115 also residing as a program in the memory system 110 generates color-mapped image files 116 from the dynamic color map 114 and the sequence of images according, for example, to the method described in reference to FIG. 3. By mapping each pixel of an image into a corresponding color space region linked to the color map, the amount of image information to be transmitted is considerably reduced. For example, where each pixel is originally defined by a 24-bit color depth, and the maximum number of color space regions linked to the color map is 256, the amount of information to be transmitted is reduced by 3 times since each of the up to 256 color space regions is identified by an 8-bit color map index as depicted, for example, by the color map illustrated in FIG. 11.

An update program 117 also residing in the memory system 110 further reduces the amount of information to be transmitted according, for example, to the method described in reference to FIG. 4. An example of such an update program is described in U.S. patent application Ser. No. 09/940,098 entitled "Method and Apparatus for Transmitting Image Updates Employing High Compression Encoding" filed Aug. 27, 2001, assigned to the same Assignee as the present invention, and incorporated in full into this specification by this reference.

A compression program 118 also residing in the memory system 110 encodes and compresses the output of the update program 117 to form at least one compressed file 119, using a conventional loss-less compressed data format such as ZLIB. Other suitable formats include the graphics interchange format (GIF), and the joint photographic experts group format (JPEG). JPEG, however, is generally not a preferred format for this application, because it is a lossy compression technique.

The server computer 101 then transmits the compressed file 119 to the client computer 102 through the communication medium 103. Although the Internet is shown as the preferred communication medium in this example, it is to be appreciated that the scope of the present invention is not to be so limited.

A decompression program 121 residing in the memory system 120 of the client computer 102 receives, decodes, and decompresses the compressed file 119 to recover information of the color-mapped image files 116. The decompression program 121 in this case is complementary to the compression program 118 to facilitate its decoding and decompression. The information recovered is essentially the information that was provided for transmission by the update program 117 as described in reference to FIG. 4.

An image rendering program 122 also residing in the memory system 120 renders the new image on the display of client computer 102 from the information recovered by the decompression program 121 and if appropriate, also from the information of the old image and existing color map stored in memory system 120. The information of the old image and existing color map are used when the update program 117 transmits image update information only instead of complete information for a new image. In this case, color map additions may be added to the existing color map to also update the color map. On the other hand, when the update program 117 transmits complete information for a new image, it also generally transmits a newly generated color map. In that case, information of the old image and existing color map are not necessary and consequently, are not used.

Although the apparatus for generating a dynamic color map for color quantization of computer images is described as being the programmed server computer 101 in this example, it is to be appreciated that the apparatus may take many forms including in its most basic form, at least one circuit that is configured to perform the described functions of the programmed server computer 101. The at least one circuit may also take many forms contemplated to be within the full scope of the present invention, including hardwired logic, or the use of one or more processors programmed by software or firmware to perform the described functions of the programmed server computer 101.

FIG. 2 illustrates, as an example, a flow diagram of a method for generating a dynamic color map that may be implemented by the color map generator 113. In 201, a pointer is initialized to a first pixel position in a buffer storing a new image in the image files 112. For convenience, this buffer is referred to as the new image buffer. In 202, the pointer is checked to see if it is pointing to a pixel position that is less than the last pixel position in the new image buffer.

Figures 5, 6:
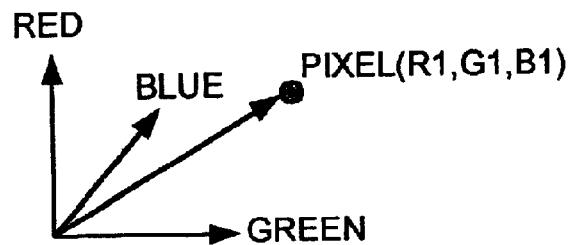
FIG. 5 illustrates an RGB color coordinate system for specifying pixel colors.
FIG. 6 illustrates a table of color depth in bits/pixel, and the number of available colors resulting from such depth.

If the answer in 202 is YES, then in 203, the method reads the RGB color value for that pixel. As is well known, in the RGB color model, colors are arranged in a 3-dimensional color space with red, green and blue axes as depicted, for example, in FIG. 5, for a pixel having red, green and blue components R1, G1 and B1. The color depth of the components determines the number of shades of red, green and blue that a pixel might have. For example, a color depth of 24-bits as shown in FIG. 6 defines 16,777,216 colors. Such high resolution is commonly referred to as being true color. An example of such a 24-bit true color pixel is shown in FIG. 7 where the 24-bits are divided up into 8-bits of red, 8-bits of green and 8-bits of blue. On the other hand, a color depth of 8-bits only defines 256 colors. Such limited resolution is commonly referred to as being pseudo color, and commonly employs a color map. In the color map, two adjacent color indexes are not necessarily similar colors. For example, color index 7 may be totally different than color index 8 depending on the color map. To find out if two colors are similar, it is necessary to calculate the distance of the true color values in the color space.

In 204, the method maps the pixel into one of a number of predefined color space regions in the 3-dimensional RGB color space. For example, the predefined color space regions may be uniformly sized with eight segments defined on the red axis, eight segments defined on the green axis and eight segments defined on the blue axis using a linear scale as depicted in FIG. 8. On the other hand, the predefined color space regions may be non-uniformly sized with the eight segments on the red, green and blue axes defined on a non-linear scale such as the logarithmic scale depicted in FIG. 9.

Preferably, the number of predefined color space regions is greater than the number of color indexes in the color map 114 so that only a subset of the predefined color space regions may be linked to the color map 114 at a given time. For example, by dividing the color space into eight segments on each of the red, green and blue axes, a total of 512 color space regions are defined. This is in contrast to an 8-bit color map, where there are only 256 color indexes available. In such case, only a maximum of 256 of the 512 color space regions may be linked to the color map at one time.

To map a pixel into one of the color space regions, the RGB components (R1, G1, B1) of the pixel must fall within a cube defined by its segment coordinates. Assuming that the color space regions have been defined so as to cover all possible pixels, then each pixel will fall into one of the color space regions.

In 205, after determining that a pixel maps into a particular color space region, a record containing certain information of that color space region is updated. An example of such a record is depicted in FIG. 10. In the example, a first field identifies the color space region by a color space number, which in this example would be one out of 512. A second field indicates a count of pixels mapped into that color space region. Third, fourth and fifth fields respectively indicate the sums of red, green and blue components of pixels mapped into the color space region. A sixth field indicates whether the color space region is being used in or linked to the current color map, and a seventh field indicates the color map index number if the color space region is being used in or linked to the current color map. Updating the record in this case would involve incrementing the count by one, and adding the pixel's red, green and blue components respectively to the numbers stored in the red, green and blue sum fields.

In 206, the method updates a list containing the color space regions ordered by their count values. In 207, the pointer is incremented, and the method jumps back to 202 to process the next pixel in the image, or generate the color map if processing of the image's pixels is completed.

If the answer in 202 is NO, indicating that processing of the image pixels is completed, then in 208, the method now generates the color map 114 by including associated colors from the highest count color space regions according to the list generated and updated in 206, up to a maximum number of color map indexes. In addition, the records of those color space regions are updated to indicate that they are being linked to the color map through their associated colors, as well as indicating the color map index that has been assigned to the associated color of that color space region. For example, each of the color space regions has an associated color having red, blue and green components equal to the average of the red, green and blue components of pixels mapped into the color space region. These averages are easily computed from the record of the color space region by dividing the red, blue and green sums stored in the record by the count also stored in the record.

In 209, if the number of color space regions having non-zero counts is less than the maximum number of color map indexes, then in 210, the remainder of unassigned color map indexes are reserved for subsequent images in the sequence of images, and the method proceeds to 211 to generate the color map. The unassigned color map indexes would then be available for assignment during the processing of subsequent images as described in reference to FIG. 3. On the other hand, if the number of color space regions having non-zero counts is greater than or equal to the maximum number of color map indexes, then the method proceeds directly to 211 to generate the color map since there are no unassigned color map indexes in that case.

FIG. 3 illustrates a flow diagram of a method for generating color-mapped images that may be implemented by the color quantization generator 115. In 301, the pointer is again initialized to a first pixel position in the new image buffer. In 302, the pointer is checked to see if it is pointing to a pixel position that is less than the last pixel position in the new image buffer.

If the answer in 302 is YES, then in 303, the method reads the RGB color value for that pixel. In 304, the method then maps the pixel into one of the predefined color space regions in the 3-dimensional RGB color space. In 305, the method then reads the record for that color space region. In 306, if the record indicates that the color space region is linked to the color map, then in 307, it writes the color map index indicated in the record to an output buffer included in the color-mapped image files 116 along with information of the pixel currently being processed. The method then proceeds to 312 where the pointer is incremented, and then to 302 to process a next pixel in the image.

On the other hand, if the record indicates that the color space region is not linked to the color map, then in 308, the method checks to see if there are any unassigned color map indexes available. If the answer to 308 is YES, then in 309, the method updates the record for the color space region as described in reference to 205 of FIG. 2, and in 310, the method links the color space region to the color map as described in reference to 208~211 of FIG. 2, and optionally, updates the list containing the color space regions ordered by their count values as described in reference to 206 in FIG. 2. The method then goes to 307, and writes the color map index indicated in the record to the output buffer included in the color-mapped image files 116 along with information of the pixel currently being processed. The method then proceeds to 312 where the pointer is incremented, and then to 302 to process a next pixel in the image.

If the answer to 308 is NO, however, then in 311, the method finds the closest associated color in the color map to the color of the pixel being processed. The closest color is then determined by calculating Euclidean distances from the pixel color represented as a vector in 3-dimensional RGB color space to each of the associated colors in the color map. The method then goes to 307, and writes the color map index assigned to the associated color that is closest to the pixel's color in the color map, to the output buffer included in the color-mapped image files 116 along with information of the pixel currently being processed. Optionally, the method may also update the color space region record corresponding to the pixel by setting its "use" field and including the color map index of the closest associated color in its "index#" field so that a subsequent pixel falling into that color space region may avoid performing 308~311, thus speeding up its processing time albeit at the expense of perhaps a less accurate color match for that subsequent pixel. The method then proceeds to 312 where the pointer is incremented, and then to 302 to process a next pixel in the image.

FIG. 4 illustrates a flow diagram of a method for transmitting a sequence of related images that may be performed by the update program 117 as described in reference to FIG. 1. To minimize the amount of information to be sent, the method only sends updates to previously transmitted images as long as differences between sequential images remain within a predetermined threshold. For example, the predetermined threshold may be an acceptable correlation factor computed between two successive images. In such case, as long as a new image correlates closely to an old image, only updates (i.e., information on the differences between the new and old images) are sent. On the hand, when there is very little correlation between the new and old images, then complete information on the new image is sent along with a newly generated color map.

Accordingly, in 401, the method first compares the new and old images in some predetermined fashion. In 402, the difference between the sequential images is then compared against a predetermined threshold. If the difference is determined to be greater than or equal to the predetermined threshold, then in 403, the method generates a new color map for the new image as described, for example, in reference to FIG. 2. In 404, the method then generates the color-mapped image of the new image as described, for example, in reference to FIG. 3. In 405 and 406, the method then provides the new color map and color-mapped image for transmission. The method then proceeds to 401, to process the next image in a sequence of images.

On the other hand, if the difference is determined in 402 to be less than the predetermined threshold, then in 407, the method generates a color-mapped image update by generating a color-mapped image of the new image as described, for example, in reference to FIG. 3, comparing the color-mapped new image with the color-mapped old image, and recording the differences between the color-mapped new and old images. Then, in 408, the method determines whether or not a new color had been added to the color map such as described in reference to 308~311 in FIG. 3. If a new color had been added, then in 409, information to update the old color map to include the new color is provided for transmission, and in 410, the color-mapped image update information to update the old image to generate the new image is provided for transmission. The method then proceeds to 401, to process the next image in a sequence of images.

In certain applications, where it is known beforehand that the sequence of images will be changing over time, 403~406 may simply be performed from time to time such as every 30 seconds or so, while between such times, 407~410 are performed on the sequence of images. In this case, 401 and 402 are not performed, thereby speeding up the processing of the sequence of images.

Although the various aspects of the present invention have been described with respect to a preferred embodiment, it will be understood that the invention is entitled to full protection within the full scope of the appended claims.

I claim:

1. A method for color quantization of an image, comprising:
   mapping pixels of an image into corresponding color space regions;
   determining whether said corresponding color space regions are linked to a color map; and
   if individual of said corresponding color space regions are not linked to said color map, then linking said individual of said corresponding color space regions to said color map where color map linkages are available, or determining color space regions that are linked to said color map and having associated colors closest to colors of the pixels of said individual of said corresponding color space regions where color map linkages are not available.

2. The method according to claim 1, wherein said mapping pixels of an image into corresponding color space regions, comprises:
   defining a plurality of color space regions in a 3-dimensional color space; and
   determining which of said plurality of color space regions each pixel of said image maps according to a color of said pixel.

3. The method according to claim 2, wherein said plurality of color space regions is formed by segmenting each axis of said 3-dimensional color space into a plurality of segments.

4. The method according to claim 3, wherein said 3-dimensional color space has a red axis segmented into eight segments, a green axis segmented into eight segments and a blue axis segmented into eight segments so that a number of said plurality of color space regions is 512.

5. The method according to claim 4, wherein said plurality of color space regions are uniformly sized.

6. The method according to claim 4, wherein said plurality of color space regions are non-uniformly sized.

7. The method according to claim 1, wherein said determining whether said corresponding color space regions are linked to a color map, comprises:
   reading records associated with said corresponding color space regions; and
   determining whether said corresponding color space regions are linked to said color map by a use indication in said records.

8. The method according to claim 1, wherein said linking said individual of said corresponding color space regions to said color map where color map linkages are available, comprises:
   determining whether color map linkages are available for said color map; and
   updating records of said individual of said corresponding color space regions so as to indicate that they are linked to said color map until either all of said records have been so updated or no more color map linkages are available.

9. The method according to claim 1, wherein said determining color space regions that are linked to said color map and having associated colors closest to colors of the pixels of said individual of said corresponding color space regions where color map linkages are not available, comprises:
   determining associated colors for color space regions linked to said color map; and
   determining which of said associated colors for color space regions linked to said color map are closest to the colors of the pixels of said individual of said corresponding color space regions.

10. The method according to claim 9, wherein said determining associated colors for color space regions linked to said color map, comprises determining for individual of said color space regions linked to said color map, an average color of pixels mapped into the color space region.

11. The method according to claim 1, further comprising:
   if individual of said corresponding color space regions are linked to said color map, then reading information of color map linkages stored in records associated with such individual of said corresponding color space regions, and storing said information of color map linkages along with information of the pixels of such individual of said corresponding color space regions.

12. The method according to claim 1, wherein said linking said individual of said corresponding color space regions to said color map where color map linkages are available, further comprises reading information of color map linkages stored in records associated with said individual of said corresponding color space regions, and storing said information of color map linkages read from said records along with information of the pixels of such individual of said corresponding color space regions.

13. The method according to claim 1, further comprising:
if individual of said corresponding color space regions are not linked to said color map, then information of color map linkages read from records of color space regions that are linked to said color map and having associated colors closest to colors of the pixels of said individual of said corresponding color space regions are stored along with information of such individual of said corresponding color space regions.

14. An apparatus for color quantization of an image, comprising at least one circuit configured to:
map pixels of an image into corresponding color space regions;
determine whether said corresponding color space regions are linked to a color map; and
if individual of said corresponding color space regions are not linked to said color map, then link said individual of said corresponding color space regions to said color map where color map linkages are available, or determine color space regions that are linked to said color map and having associated colors closest to colors of the pixels of said individual of said corresponding color space regions where color map linkages are not available.

15. The apparatus according to claim 14, wherein said at least one circuit is further configured to:
if individual of said corresponding color space regions are linked to said color map, then read information of color map linkages stored in records associated with such individual of said corresponding color space regions, and store said information of color map linkages along with information of the pixels of such individual of said corresponding color space regions.

16. The apparatus according to claim 14, wherein said at least one circuit is further configured to:
if individual of said corresponding color space regions are not linked to said color map, then store information of color map linkages read from records of color space regions that are linked to said color map and having associated colors closest to colors of the pixels of said individual of said corresponding color space regions along with information of such individual of said corresponding color space regions.

17. The apparatus according to claim 14, wherein said at least one circuit includes a processor that is configured by programming said processor.

18. The apparatus according to claim 14, wherein said at least one circuit includes at least one logic circuit.

* * * * *